United States Patent
Bird

(10) Patent No.: US 6,168,210 B1
(45) Date of Patent: Jan. 2, 2001

(54) PIPE COUPLING

(75) Inventor: Edwin A. Bird, Ashdown, AR (US)

(73) Assignee: M & FC Holding Company, Inc., Wilmington, DE (US)

( * ) Notice: Under 35 U.S.C. 154(b), the term of this patent shall be extended for 0 days.

(21) Appl. No.: 09/100,221

(22) Filed: Jun. 19, 1998

(51) Int. Cl.$^7$ .................................................. F16L 17/02
(52) U.S. Cl. ........................... 285/337; 285/369; 285/910
(58) Field of Search ..................................... 285/337, 342, 285/341, 343, 910, 369, 354, 413; 277/623, 626, 612, 615

(56) References Cited

U.S. PATENT DOCUMENTS

| | | | |
|---|---|---|---|
| 660,862 | * 12/1900 | Lovekin ................................ | 277/612 |
| 1,567,813 | 12/1925 | Oleson . | |
| 1,936,552 | 11/1933 | Goss . | |
| 1,951,034 | 3/1934 | Norton ................................ | 285/119 |
| 1,984,806 | 12/1934 | Pfefferle . | |
| 2,247,031 | 6/1941 | Norton ................................ | 285/166 |
| 2,247,032 | 6/1941 | Norton ................................ | 285/166 |
| 2,491,004 | 12/1949 | Graham ................................ | 285/193 |
| 2,822,195 | * 2/1958 | Hoke ................................... | 285/413 |
| 3,065,000 | 11/1962 | Stanton ................................ | 285/117 |
| 3,078,332 | 2/1963 | Marx .................................... | 174/91 |
| 3,432,176 | 3/1969 | Valenziano .......................... | 277/168 |
| 3,547,471 | 12/1970 | Dunmire .............................. | 285/337 |
| 3,567,258 | 3/1971 | Scaramucci ........................ | 285/334.4 |
| 3,669,475 | 6/1972 | Luckenbill et al. ................ | 285/348 |
| 3,740,082 | 6/1973 | Schustack .......................... | 285/342 |
| 4,603,893 | 8/1986 | Takahashi ......................... | 285/342 |
| 4,909,520 | 3/1990 | Gallagher ........................... | 277/177 |
| 4,936,609 | * 6/1990 | Metcalfe ............................. | 285/337 |
| 5,150,929 | 9/1992 | Greatorex ........................... | 285/231 |
| 5,335,946 | 8/1994 | Dent et al. .......................... | 285/243 |
| 5,348,351 | 9/1994 | LaFleur et al. ..................... | 285/110 |
| 5,476,292 | 12/1995 | Harper ............................... | 285/337 |
| 5,603,508 | 2/1997 | Dole et al. .......................... | 277/1 |

FOREIGN PATENT DOCUMENTS

| | | | |
|---|---|---|---|
| 461593 | * 6/1928 | (DE) | ...................................... 285/910 |
| 573320 | * 6/1924 | (FR) | ...................................... 285/354 |
| 26 27572 | * 8/1989 | (FR) | ...................................... 285/337 |
| 2016626 | * 9/1979 | (GB) | ...................................... 285/337 |
| 2 251 045 | 6/1992 | (GB) . | |
| 2251905 | * 7/1992 | (GB) | ...................................... 285/337 |
| 79-01116 | * 12 1979 | (WO) | ...................................... 285/369 |

OTHER PUBLICATIONS

Viking Johnson, *Ultra Wide Range Couplings*, Viking Johnson Sales Brochure, (Catalogue 23 Jun. 1996) (4 pages).

Heldon, *Heldon Ultra Range Jointing System*, Heldon Sales Brochure (date unknown) (4 pages).

* cited by examiner

*Primary Examiner*—Dave W. Arola
(74) *Attorney, Agent, or Firm*—Terrence (Terry) Martin; Sean D. Detweiler; Jules Jay Morris

(57) ABSTRACT

A pipe coupling (10) for coupling and sealing adjacent ends of two pipe sections (12, 14) of the same or different outer diameters. The pipe coupling (10) includes an annular sleeve (24), a pair of annular gaskets (22) and a pair of follower flanges (20) that surround the adjacent ends of the pipe sections (12, 14). The gaskets (22) have inclined front walls (42) that are angled generally complementary to clamping surfaces (28) formed at opposite ends of the sleeve (24). The gaskets further include inclined back walls (52). As the follower flanges (20) are urged toward the opposite ends of the sleeve (24), the inclined back walls (52) of the gaskets (22) cooperate with skirts (32) formed on the follower flanges (22) to cause the gaskets (22) to readily toe-in toward the outer walls of the pipe sections (12, 14) at relatively low torque and cause sealing engagement with pipe ends sections (12, 14). The follower flange skirts (32) may include inclined skirt walls (60) to further facilitate action of the gaskets (22).

54 Claims, 3 Drawing Sheets

PIPE COUPLING

FIELD OF THE INVENTION

The present invention relates generally to pipe couplings and joints and, more particularly, to pipe couplings adapted to couple and seal adjacent ends of two pipe sections of the same or different diameters.

BACKGROUND OF THE INVENTION

Conventional pipe couplings for coupling and sealing adjacent ends of two pipe sections include a coupling sleeve or collar that overlies the junction of the pipes and is sealed at each end by an annular gasket and a follower flange. Each gasket is disposed about a respective end of the pipe sections and includes an inclined or bevelled front wall that extends radially outwardly and axially rearwardly from the nose or toe of the gasket toward the radially outwardly-most aspect (i.e., the top wall or outer diameter) of the gasket, and an axially outwardly directed flat back wall in the heel section of the gasket that extends down from the top wall to the radially inwardly-most aspect of the gasket (i.e., the bottom wall or inner diameter). The inclined front walls of the gaskets are angled generally complementary to clamping walls formed at opposite ends of the sleeve. As the pipe coupling is tightened to move the follower flanges axially toward each other, the flat back walls of the gaskets engage flat skirt walls of the follower flanges to drive the gaskets toward the sleeve. As a consequence, the inclined front walls of the gaskets are driven into the clamping walls of the sleeve to toe-in the nose or toe of the gaskets toward the outer walls of the pipes and form a fluid tight seal therebetween as the pipe coupling is tightened.

Typically, a substantial extent of the gasket back wall must contact the skirt wall of the follower flange to ensure that there is adequate surface area contact or gripping between the gaskets and follower flanges so as to reduce the amount of gasket material that may flow or extrude between the skirt walls and the outer walls of the pipes. Thus, the gasket back wall must be formed with a sufficient radial dimension to ensure that more than fifty-percent of the gasket back wall engages the skirt wall of the follower flange over a wide range of pipe wall outer diameters.

Pipe couplings of the type described above typically require significant torque to cause the gaskets to toe-in sufficiently to seal the adjacent ends of the pipe sections. Proper toe-in of the gasket is achieved only after the gasket nose has been driven into the clamping walls of the sleeve with sufficient force to turn the gasket nose toward and into sealing engagement with the adjacent ends of the pipe sections. Moreover, known annular gaskets used in conventional pipe couplings are typically quite limited in the range of toe-in, and so a given sized gasket can not readily accommodate a wide range of pipe end diameters. In the field, however, the outer diameters of the pipe sections which may need to be joined together can vary by as much as 1½ to 2½ inches for the same nominal diameter. With typical prior pipe couplings gaskets, there was a need to maintain an inventory of numerous sizes of gaskets and flanges for each nominal pipe size to accommodate the wide range of pipe ends encountered in the field.

One proposal to reduce inventory has been to provide a notch in the flat gasket back wall that is held in place by a lip formed on the flange skirt wall. The gasket is intended to be held against extrusion and to allow greater toe-in range by cooperation of the notch and the lip. It is believed, however, that such a proposal is not likely successful for a number of reasons. By way of example, it is thought that the gasket material below the lip would tend to extrude axially outwardly and could pull the gasket over the lip resulting in failure of the seal.

Thus, there is a need for a pipe coupling that will seal adjacent ends of two pipe sections of significantly different diameters with a common size gasket and flange. There is also a need for a pipe coupling that reduces extrusion of gasket material between the follower flanges and the outer pipe walls. There is yet also a need for a pipe coupling that does not sacrifice the sealing capability of the pipe coupling with adjacent ends of two pipe sections, yet toes-in at relatively low torque.

SUMMARY OF THE INVENTION

The present invention overcomes the foregoing and other shortcomings and drawbacks of the pipe couplings heretofore known. While the invention will be described in connection with one embodiment, it will be understood that the invention is not limited to that embodiment. On the contrary, the invention includes all alternatives, modifications and equivalents as may be included within the spirit and scope of the present invention.

In accordance with the principles of the present invention, a pipe coupling is provided with an annular gasket that includes a radially outwardly angled or inclined back wall formed on the heel portion of the gasket. The inclined back wall of the gasket initially forms a gap with the skirt wall of the follower flange before the pipe coupling bolts are tightened. As the bolts are tightened, the gasket back wall naturally tilts toward the skirt wall to close the gap formed therebetween. Tilting of the gasket back wall causes the nose of the gasket to toe-in toward the outer pipe wall to seal the ends of the pipe sections and to bring the gasket front wall under the clamping wall of the sleeve at lower torque than conventional pipe couplings.

Additionally, tilting of the back wall of the gasket presents a full-face of gasket material to the skirt wall. The inclined back wall of the gasket thus provides a surface area substantially equal to that of prior flat-back gaskets for contact with the skirt wall of the follower flange while allowing for the gasket to toe-in over a wider range than most conventional gaskets. With the inclined gasket back wall, the gasket heel is urged radially outwardly to thereby reduce the likelihood of extrusion of gasket material between the skirt wall and the outer walls of the pipe sections as the pipe coupling is compressed to form a seal. To further facilitate the tendency of the gasket to be urged radially outwardly and away from extruding, the skirt walls of the follower flanges may also be angled or inclined in a radially outwardly direction.

The inclined back wall of each gasket may be disposed at an angle of about 20° relative to a line perpendicular to an axis of the gasket. The inclined skirt wall of each follower flange may be disposed at an angle of about 10° relative to a line perpendicular to an axis of the follower flange such that the angle of the gasket back wall is approximately twice the angle of the skirt wall. Each follower flange may include an inclined corner wall at the top of the skirt wall to prevent snagging or pinching of gasket material between the sleeve and the follower flange as the pipe coupling is tightened. An annular bead may be formed on the inclined top wall of each gasket to reduce friction between the gasket and the sleeve clamping wall as they slide relative to each other as the pipe coupling is tightened and to help facilitate toe-in of the gasket underneath the sleeve clamping wall.

The pipe coupling of the present invention seals adjacent ends of two pipe sections at lower torque than conventional pipe couplings through the cooperation of the inclined gasket back wall and the skirt wall of the follower flange. The pipe coupling of the present invention also reduces extrusion of gasket material between the skirt wall of the follower flange and the outer walls of the pipe sections. Moreover, the pipe coupling of the present invention allows for one size of gasket and flange to be used to seal a wide range of pipe end sizes without sacrificing the sealing capability of the pipe coupling.

The above features and advantages of the present invention will be better understood with reference to the accompanying figures and detailed description.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the present invention.

DETAILED DESCRIPTION OF SPECIFIC EMBODIMENTS

Figure 1:
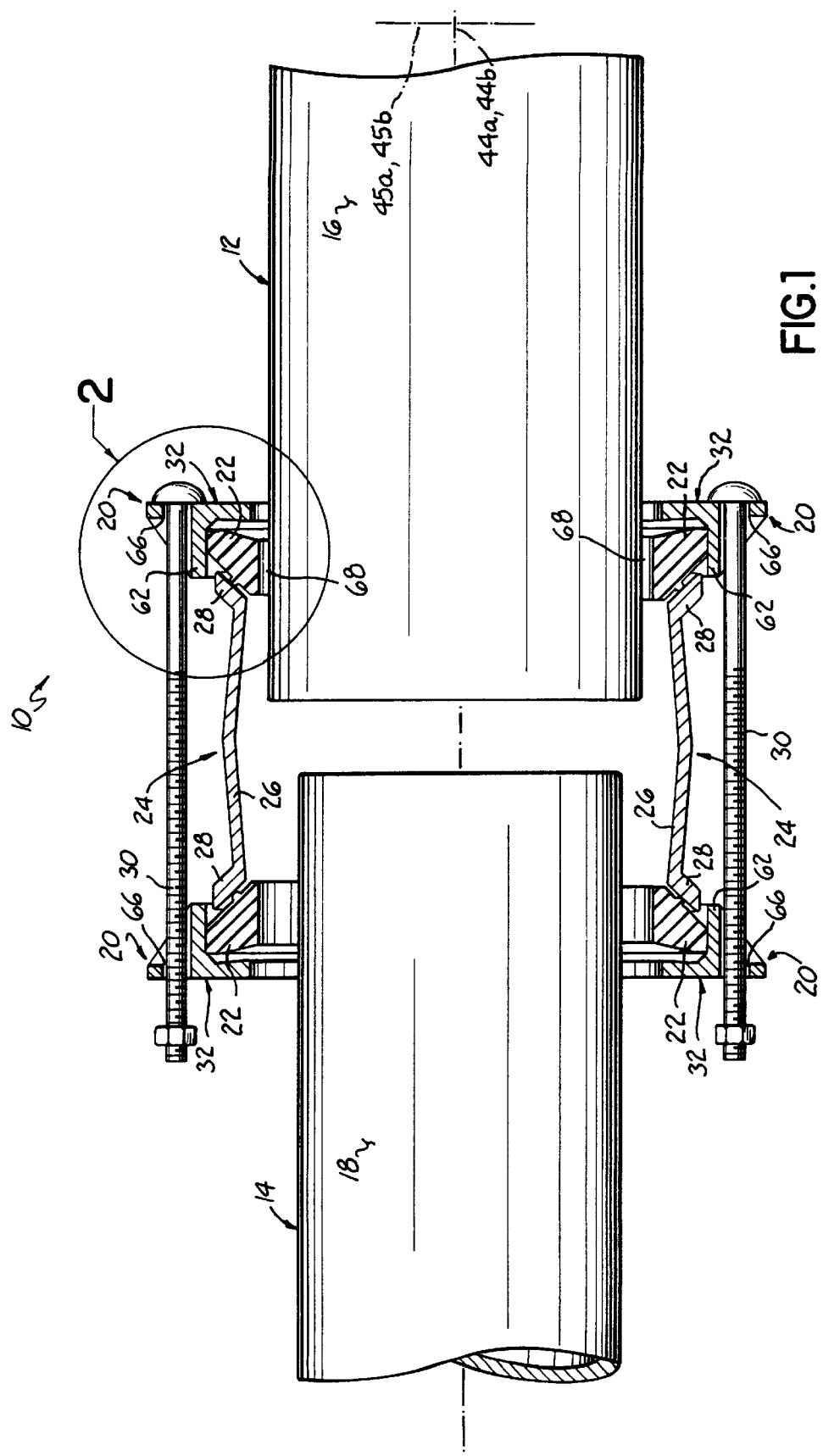
FIG. 1 is a cross-sectional view of a pipe coupling in accordance with the principles of the present invention coupling adjacent ends of a pair of pipe sections.

With reference to the figures, and to FIG. 1 in particular, a pipe coupling 10 is shown in accordance with the principles of the present invention for coupling adjacent pipe end sections 12 and 14. Pipe sections 12 and 14 are preferably plain end pipes that may have the same or different outer diameters. By way of example and not limitation, pipe coupling 10 will be discussed in connection with a nominal 150 mm pipe system such that as shown in FIG. 1, pipe end section 12 on the right-hand side of the figures may be a metric cast iron pipe having an OD of 185 mm and pipe end section 14 shown on the left-hand side may be a metric PVC pipe having an OD of 160 mm such that the pipe coupling 10 has to seal pipe ends having a variation in OD of about 25 mm. Pipe coupling 10 is adapted to surround the adjacent ends of pipe sections 12 and 14 and provide a fluid tight seal with the outer walls 16 and 18 of the pipes with the same size gasket and flange surrounding each pipe end 12, 14 as will be described in detail below.

Pipe coupling 10 includes a pair of follower flanges 20 and a pair of annular gaskets 22 that are positioned about respective ends of the pipe sections 12 and 14. A sleeve or collar 24 is provided that has a generally cylindrical body portion 26 and a pair of outwardly extending clamping walls 28 formed at opposite ends of the sleeve 24. The clamping walls 28 extend axially and radially outwardly at an angle of about 45° relative to a longitudinal axis of the sleeve 24, although other angles of clamping walls 28 are possible without departing from the spirit and scope of the present invention. Sleeve 24 has an inner diameter sized larger than the maximum outer diameter of pipe walls 16 and 18. In the embodiment shown for 150 mm nominal pipe ends 12, 14, the inner diameter of collar 24 is not less than about 193 mm and clamping walls 28 extend out to about 234 mm. Pipe section ends 12 and 14 are slidably received in opposite ends of sleeve 24 so that they abut or lie in generally close proximity and are surrounded by the sleeve 24.

The follower flanges 20 are operatively coupled by a series of compression members 30, such as elongated bolts, that are tightened to apply a compressive load to pipe coupling 10. As pipe coupling 10 is tightened, annular skirts 32 formed on the follower flanges 20 contact and urge the gaskets 22 into sealing engagement with the clamping walls 28 and outer walls 16 and 18 of pipes 12 and 14 as will be described in greater detail below.

Figure 2:
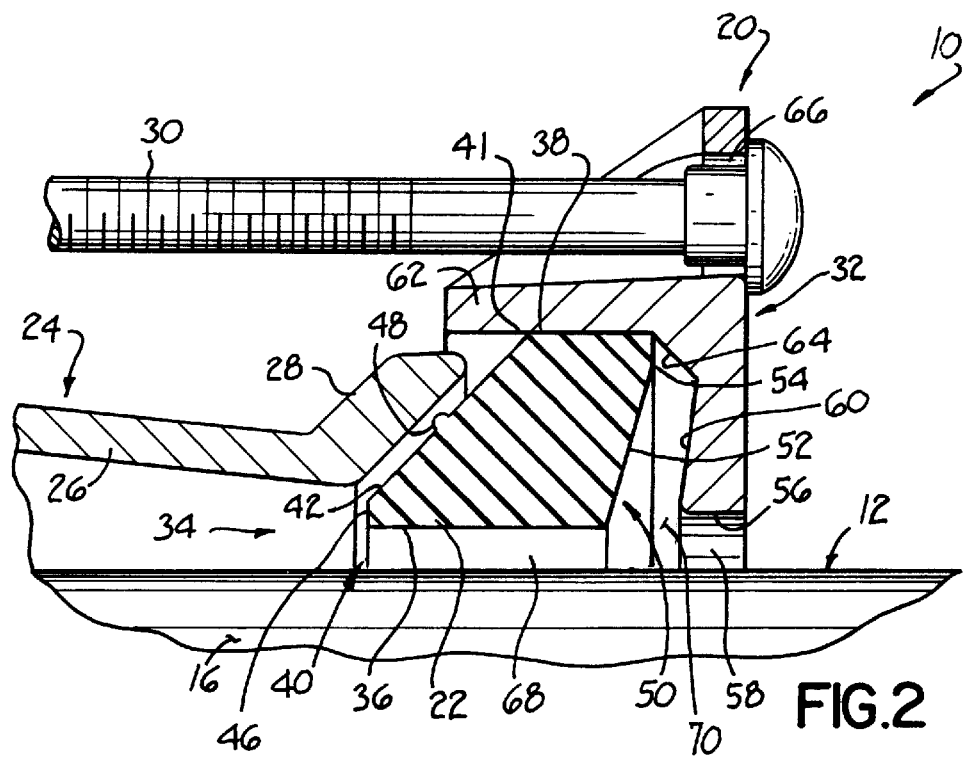
FIG. 2 is an enlarged view of the encircled area shown in FIG. 1 showing the pipe coupling as initially installed and before torque is applied to seal the gaskets against the outer walls of the pipe sections.

The pair of annular gaskets 22, preferably made of EPDM or nitrile rubber, are positioned within gaps 34 formed at opposite ends of sleeve 24 between the sleeve clamping walls 28 and the respective outer pipe walls 16 and 18. With reference to FIG. 2, each gasket 22 is shown in its uncompressed state where it can be seen that the radially inwardly-most aspect or inner diameter defines a generally cylindrical bottom wall 36 that has a diameter sized slightly larger than the largest outer diameter of pipe sections 12 and 14, although it will be appreciated that bottom wall 36 could have a diameter that is sized either equal to or even less than the outer diameters of one or both of pipe sections 12 and 14. Gaskets 22 further include a radially outwardly-most aspect or outer diameter defining generally cylindrical top wall 38 that is spaced from and formed generally parallel to the gasket bottom wall 36. In the embodiment shown, the inner and outer diameters at walls 36 and 38 are 191 mm and 241 mm, respectively.

Proximate a toe portion 40 of each gasket 22, an angled or inclined front wall 42 is formed extending generally from gasket bottom wall 36 to gasket top wall 38 to define corner 41. Gasket top wall 38 in the embodiment described is about 47 mm wide. The inclined front wall 42 is disposed at an angle of about 45° relative to an axis 44a of gasket 22 such that it is substantially equal to the angle of sleeve clamping walls 28, although the angles could be different without departing from the spirit and scope of the present invention. An abrupt wall 46 extends generally perpendicularly from the gasket bottom wall 36 and intersects the inclined front wall 42. Inclined front wall 42 of gaskets 22 may include at least one annular bead 48 formed on and extending outwardly therefrom.

Proximate a heel portion 50 of each gasket 22, an angled or inclined back wall 52 is formed extending axially and radially outwardly from the gasket bottom wall 36 (i.e., in a direction away from sleeve 24 as shown in the Figures). The inclined back wall 52 extends generally between the gasket bottom and top walls 36 and 38 at an angle of at least 5°, and advantageously about 20° (e.g., 22 ½°), relative to a line 45b perpendicular to an axis 44b of the gasket 22. An abrupt wall 54 extends generally perpendicularly from the gasket top wall 38 and intersects the inclined back wall 52.

The pair of follower flanges 20 are positioned about the pipe sections 12 and 14 at opposite ends of the sleeve 24. The skirts 32 of follower flanges 20 include a cylindrical bottom wall 56 that has a diameter sized slightly larger than the largest outer diameter of pipe sections 12 and 14. The skirts 32 form annular gaps 58 between the bottom walls 56 and the outer walls 16 and 18 of respective pipe sections 12 and 14. In the embodiment shown, the diameter at wall 56 is 191 mm.

Each follower flange 20 includes an annular skirt wall 60 formed on skirt 32 that faces or confronts the inclined back wall 52 of each gaskets 22. The skirt walls 60 extend axially and radially outwardly from the bottom walls 56 of skirts 32 (i.e., in a direction away from sleeve 24 as shown in the Figures). The skirt walls 60 are disposed at an angle of at least about 2 ½° and advantageously about 10° relative to a line 45a perpendicular to the axis 44a of follower flanges 20 such that the angle of the inclined gasket back wall 52 is approximately or just slightly more than about twice that of the angle formed by the skirt walls 60.

Each follower flange 20 may include a guide ring 62 that extends generally perpendicularly and axially inwardly from the skirt 32 so as to be adapted to overlie the gaskets 22. The inner aspect of guide ring 62 defines an inner diameter that is advantageously equal to or larger than the outer diameter of gasket top wall 38 such that gasket 22 is snugly received thereagainst with corner 41 situated at or above the level of sleeve clamping wall 28. A corner wall or kicker 64 is formed extending between the guide ring 62 and the skirt 32 at an angle of about 45° relative to the axis 44a of the follower flange 20 so as to lie adjacent abrupt wall 54 of gasket 22.

Follower flanges 20 include a series of circumferentially spaced openings 66 for receiving the elongated bolts 30 as shown in the figures. The bolts 30 operatively connect the follower flanges 20, and urge the follower flanges 20 axially inwardly toward the opposite ends of sleeve 24 as the bolts 30 are tightened to apply a compressive load on the pipe coupling 10. The compressive load applied to pipe coupling 10 causes the toe portions 40 of gaskets 22 to toe-in at lower torque and form a fluid tight seal between sleeve 26 and the outer pipe walls 16 and 18.

Figure 3:
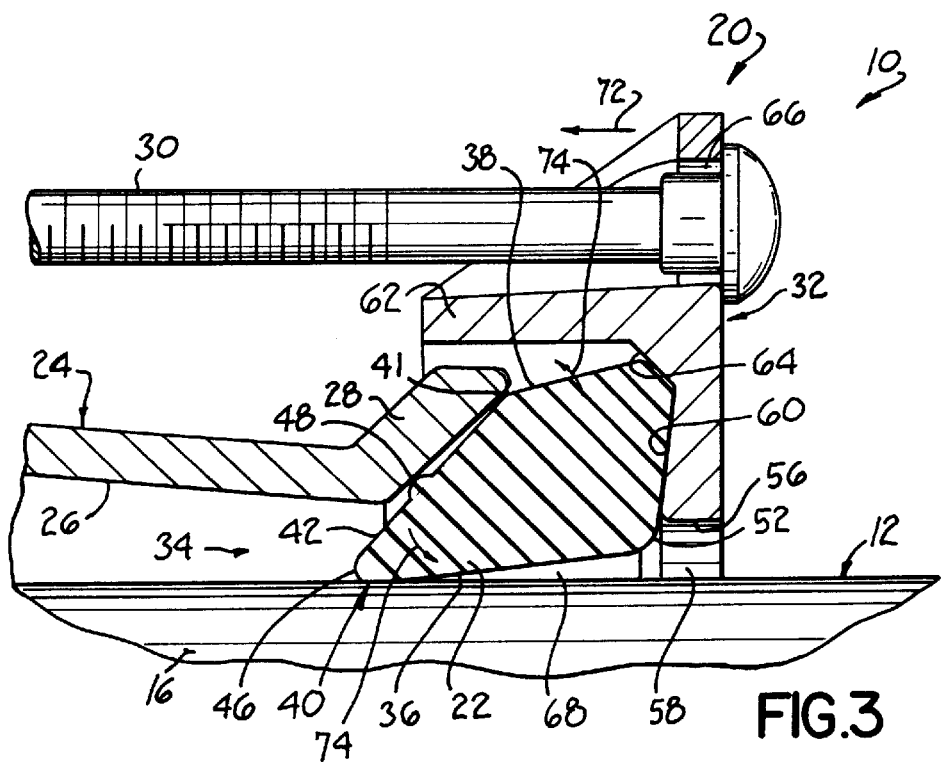
FIG. 3 is a view similar to FIG. 2 showing intermediate operation of the pipe coupling as the gaskets are brought into sealing engagement with the outer walls of the pipe sections.
Figure 4:
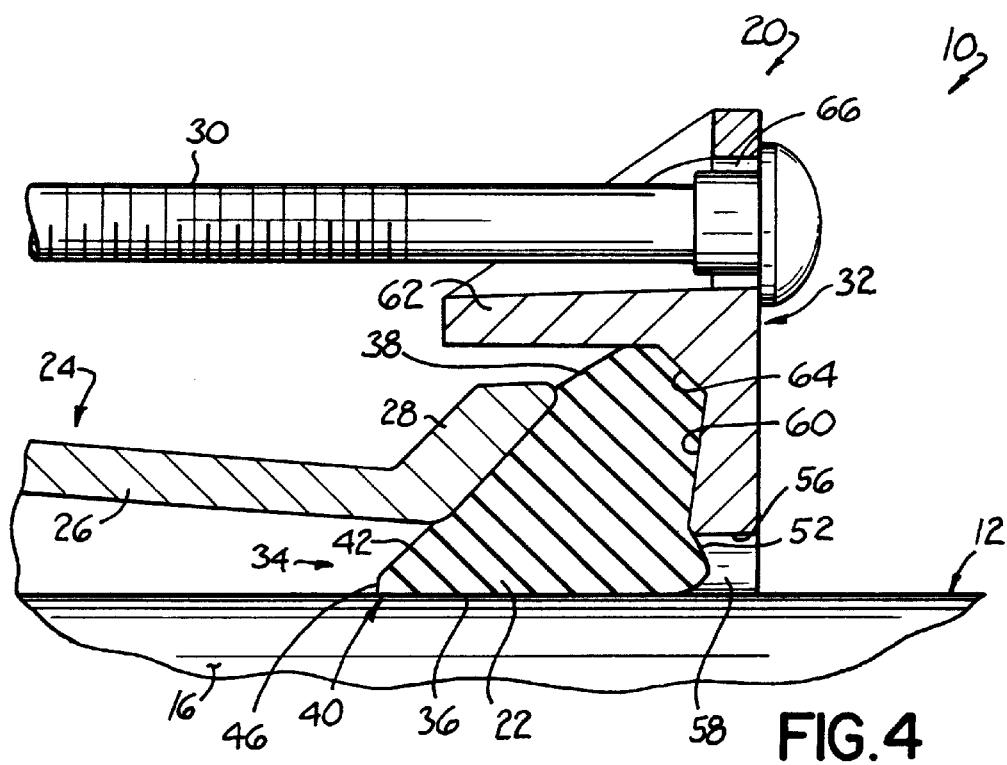
FIG. 4 is a view similar to FIG. 3 showing final operation of the pipe coupling in sealing engagement between the sleeve and the adjacent ends of the pair of pipe sections.

In use, as best understood with reference to FIGS. 2–4, the pipe coupling 10 is positioned about the adjacent ends of pipe sections 12 and 14 with the annular gasket 22 disposed in the gap 34 formed between the sleeve clamping wall 28 and the outer pipe walls 16 and 18. While FIGS. 2–4 illustrate the right-hand side of pipe coupling 10, it will be appreciated that the same description applies to the left-hand side as well.

In the generally uncompressed state of pipe coupling 10 as shown in FIG. 2, the annular gasket 22 is positioned about the end of pipe section 12 with the inclined front wall 42 facing or confronting sleeve clamping wall 28 such that top wall 38 and corner 41 extend radially outwardly of clamping wall 28, and inclined back wall 52 faces or confronts skirt wall 60. As described above, annular gap 58 is formed between the skirt bottom wall 56 and the outer pipe wall 16. Depending on the outer diameter size of pipe section 12, a slight gap 68 may be formed between the gasket bottom wall 36 and the outer pipe wall 16. Due to the formation of different angles on the inclined gasket back wall 52 and the inclined skirt wall 60 of follower flange 20, a gap 70 is formed between the gasket heel portion 50 and the skirt wall 60. Kicker 64 tends to widen gap 70.

As bolts 30 are tightened to urge follower flange 20 toward the one end of sleeve 24, as represented by arrow 72 in FIG. 3, inclined gasket front wall 42 slides axially and radially inwardly beneath clamping wall 28 while at the same time, inclined gasket back wall 52 pivots or tilts, as represented by arrows 74, until the gasket back wall 52 closes gap 70 by engaging skirt wall 60. The abrupt wall 54 formed on gasket 22 and the corner wall 64 formed on follower flange 20 cooperate to move gasket 22 radially inwardly while allowing gasket 22 to pivot so that corner 41 tends to slide under clamping wall 28 of sleeve 26. In this way, undesirable snagging or pinching of gasket material 22 as at corner 41 between sleeve clamping wall 28 and flange guide ring 62 is avoided as pipe coupling 10 is tightened.

The pivoting of gasket 22 causes the toe portion 40 to immediately toe-in toward the outer pipe wall 16 even before a full compressive load is applied to pipe coupling 10. Annular bead 48 on inclined gasket front wall 42 reduces friction with clamping wall 28 as they slide relative to each other in the presence of the compressive force applied by bolts 30, and helps to bring corner 41 into engagement with and beneath clamping wall 28 of sleeve 26 as exemplified in FIG. 3. Bead 48 may also be caused to come away from clamping wall 28 as corner 41 pivots and is driven thereagainst.

Still referring to FIG. 3, as the gasket toe portion 40 toes-in and is driven into sealing engagement with the outer pipe wall 16 and corner 41 engages into clamping wall 28, the inclined gasket back wall 52 is urged radially outwardly or upwardly against inclined skirt wall 60 so as to be urged away from outer pipe wall 16 and away from extruding out below skirt wall 56.

Referring now to FIG. 4, as additional compressive force is applied to follower flanges 20 through tightening of bolts 30, the skirt wall 60 is moved axially closer to the sleeve clamping wall 28 to further toe-in and drive the gasket toe portion 40 into sealing engagement with outer pipe wall 16 and the corner 41 into sealing engagement with sleeve clamping wall 28 to thereby seal the pipe ends. At the same time, the compressive force applied to the pipe coupling 10 causes the gasket heel portion 50 to slightly extrude through the annular gaps 58 formed between the skirt bottom walls 56 and pipe outer walls 16 and 18 to improve the fluid seal. However, angled back wall 52 and/or inclined skirt wall 60 generally urges the gasket heel portion 50 upwardly and away from the outer pipe wall 16 which reduces the extrusion of gasket material through the annular gap 58.

It will be appreciated that as the gasket back wall 52 tilts against skirt wall 60, the full face of wall 52 provides surface to bear against skirt wall 60. The length of that surface contact area is greater than the radial thickness of heel 50 gasket 22 in the uncompressed and untilted state. Consequently, the extent of gasket back wall 52 after it tilts is sufficient to ensure that more than fifty-percent of the gasket back wall 52 will contact the skirt wall 60.

From the above disclosure of the general principles of the present invention and the preceding detailed description, those skilled in the art will readily comprehend various modifications to which the present invention is susceptible. By way of example, the angles of the inclined back wall 52 of gasket 22 or the skirt wall 60 of follower flanges 20, or both, could be increased or decreased without departing from the spirit and scope of the present invention, provided the incline is more than just due to effectively inconsequential draft as may be encountered in a molding or casting operation. Likewise, the angles of the sleeve clamping wall 28 or the inclined gasket front walls 42, or both, could also be increased or decreased. Similarly, the outer diameter of gasket 22 could be less than the inner diameter of guide ring 62 and/or top wall 38 thereat could be angled so as not to be parallel to bottom wall 36 and, optionally, could be a continuation of the inclined front wall. Moreover, annular beads or ribs (not shown) may be formed on the gasket bottom walls 36 to further improve the fluid tight seal between the gaskets 22 and the adjacent ends of pipe sections 12 and 14. Moreover, the principles of the present invention are applicable to other nominal pipe sizes and ranges, it being understood that the 150 mm nominal pipe ends 12, 14 are shown solely by way of example and not limitation. The invention in its broader aspects is therefore not limited to the specific details and illustrative example shown and described. Accordingly, departures may be made from such details without departing from the spirit or scope of Applicant's general inventive concept.

Having described the invention, what is claimed is:

1. A pipe coupling for coupling adjacent ends of a pair of pipe sections, comprising:
    a sleeve having a generally cylindrical body portion adapted in use to receive and overlie the adjacent ends of said pipe sections;
    a pair of annular gaskets adapted in use to be positioned about the adjacent ends of said pipe sections, the annular gaskets each including a bottom wall adapted to be disposed about an outer wall of a respective said pipe section, a front wall adapted to engage and at least partially underlie the sleeve, and a back wall extending radially outwardly from the bottom wall;
    a pair of follower flanges adapted in use to be positioned about the adjacent ends of said pipe sections at opposite ends of the sleeve, each of the follower flanges including a skirt having a bottom wall adapted to be disposed about the outer wall of a respective said pipe section and a generally flat, inclined skirt wall in axial cross-section extending axially and radially outwardly from the skirt bottom wall in a direction away from the sleeve and adapted to confront the back wall of a respective one of the gaskets, the inclined skirt wall being disposed at an angle of at least 2 ½° relative to a line perpendicular to an axis of the follower flange; and
    a plurality of compression members operatively connecting the pair of follower flanges for urging the follower flanges together whereby to compress the gaskets into sealing engagement between the sleeve, the follower flanges and the outer walls of said pipe sections to provide a fluid tight seal therebetween.

2. The pipe coupling of claim 1 wherein each of the follower flanges further includes a guide ring extending generally perpendicularly from the skirt and adapted in use to overlie the respective annular gasket.

3. The pipe coupling of claim 1 wherein each of the gasket back walls is inclined to extend axially and radially outwardly from the bottom wall in a direction away from the sleeve.

4. The pipe coupling of claim 3 wherein the inclined gasket back walls are disposed at a first angle relative to a line perpendicular to an axis and the inclined skirt walls are disposed at a second angle relative to the perpendicular line, the first angle being about twice the second angle.

5. The pipe coupling of claim 3 wherein each of the inclined gasket back walls is disposed at an angle of at least 5° relative to a line perpendicular to an axis of the gasket.

6. The pipe coupling of claim 5 wherein the angle is about 20°.

7. The pipe coupling of claim 1 wherein each of the inclined skirt walls is disposed at an angle of about 10° relative to a line perpendicular to an axis of the follower flange.

8. The pipe coupling of claim 1 further including a least one annular bead formed on the front walls of the gaskets.

9. The pipe coupling of claim 1 wherein each of the follower flanges includes a corner wall at the top of the skirt.

10. The pipe coupling of claim 1 wherein each of the gaskets includes a top wall spaced radially outwardly from said bottom wall.

11. The pipe coupling of claim 1 wherein the gasket back wall is generally flat.

12. A pipe coupling for coupling adjacent ends of a pair of pipe sections, comprising:
    a sleeve having a generally cylindrical body portion adapted in use to receive and overlie the adjacent ends of said pipe sections;
    a pair of annular gaskets adapted in use to be positioned about the adjacent ends of said pipe sections, the annular gaskets each including a bottom wall adapted to be disposed about an outer wall of a respective said pipe section, a front wall adapted to engage and at least partially underlie the sleeve, and a generally flat back wall extending radially outwardly from said bottom wall;
    a pair of follower flanges adapted in use to be positioned about the adjacent ends of said pipe sections at opposite ends of the sleeve, each of the follower flanges including a skirt having a bottom wall adapted to be disposed about the outer wall of a respective said pipe section and an inclined skirt wall extending axially and radially outwardly from the skirt bottom wall in a direction away from the sleeve and adapted to confront the back wall of a respective one of the gaskets; and
    a plurality of compression members operatively connecting the pair of follower flanges for urging the follower flanges together whereby to compress the gaskets into sealing engagement between the sleeve, the follower flanges and the outer walls of said pipe sections to provide a fluid tight seal therebetween.

13. The pipe coupling of claim 12 wherein each of the gaskets includes a top wall spaced radially outwardly from said bottom wall.

14. The pipe coupling of claim 12 wherein each of the follower flanges further includes a guide ring extending generally perpendicularly from the skirt and adapted in use to overlie the respective annular gasket.

15. The pipe coupling of claim 12 wherein each of the gasket back walls is inclined to extend axially and radially outwardly from the bottom wall in a direction away from the sleeve.

16. The pipe coupling of claim 15 wherein the inclined gasket back walls are disposed at a first angle relative to a line perpendicular to an axis and the inclined skirt walls are disposed at a second angle relative to the perpendicular line, the first angle being about twice the second angle.

17. The pipe coupling of claim 15 wherein each of the inclined gasket back walls is disposed at an angle of at least about 5° relative to a line perpendicular to an axis of the gasket.

18. The pipe coupling of claim 17 wherein the angle is about 20°.

19. The pipe coupling of claim 12 wherein each of the inclined skirt walls is disposed at an angle of about 10° relative to a line perpendicular to an axis of the follower flange.

20. The pipe coupling of claim 12 further including at least one annular bead formed on the front walls of the gaskets.

21. The pipe coupling of claim 12 wherein each of the follower flanges includes a corner wall at the top of the skirt.

22. The pipe coupling of claim 12 wherein each of the gaskets includes a top wall spaced radially outwardly from said bottom wall.

23. The pipe coupling of claim 12 wherein the skirt walls are generally flat.

24. A gasket for a pipe coupling adapted to join adjacent ends of a pair of pipe sections, the pipe coupling including a sleeve adapted in use to receive and overlie the adjacent ends of the pipe sections, a pair of follower flanges adapted in use to be positioned about the adjacent ends of the pipe sections at opposite ends of the sleeve, the follower flanges each including a skirt, and a plurality of compression members operatively connecting the pair of follower flanges for urging the follower flanges toward the opposite ends of the sleeve, the gasket comprising:
- a toe portion;
- a heel portion;
- a bottom wall adapted in use to surround an outer wall of a said pipe section;
- an inclined front wall formed proximate to the toe portion and adapted in use to engage and at least partially underlie one end of the sleeve; and
- a generally flat inclined back wall in axial cross-section formed proximate to the heel portion and extending axially and radially outwardly from the bottom wall in a direction away from the sleeve, the inclined back wall being adapted in use to cooperate with the follower flange.

25. The gasket of claim 24 wherein the inclined gasket back wall is disposed at an angle of at least about 5° relative to a line perpendicular to an axis of the gasket.

26. The gasket of claim 25 wherein the angle is about 20°.

27. The gasket of claim 24 further including a generally flat wall formed proximate to the heel portion and extending from the inclined back wall.

28. The gasket of claim 24 further including at least one annular bead formed on the inclined front wall of the gasket.

29. The gasket of claim 24 further including a top wall spaced from the bottom wall.

30. The gasket of claim 29, the top wall being generally parallel to the bottom wall.

31. A gasket for a pipe coupling adapted to join adjacent ends of a pair of pipe sections, the pipe coupling including a sleeve adapted in use to receive and overlie the adjacent ends of the pipe sections, a pair of follower flanges adapted in use to be positioned about the adjacent ends of the pipe sections at opposite ends of the sleeve, the follower flanges each including a skirt, and a plurality of compression members operatively connecting the pair of follower flanges for urging the follower flanges toward the opposite ends of the sleeve, the gasket comprising:
- a toe portion;
- a heel portion;
- a bottom wall adapted in use to surround an outer wall of a said pipe section;
- an inclined front wall formed proximate to the toe portion and adapted in use to engage and at least partially underlie one end of the sleeve; and
- an inclined back wall formed proximate to the heel portion and extending directly axially and radially outwardly from the bottom wall in a direction away from the sleeve, the inclined back wall being adapted in use to cooperate with the follower flange.

32. The gasket of claim 31 further including a top wall spaced from the bottom wall.

33. The gasket of claim 32, the top wall being generally parallel to the bottom wall.

34. The pipe coupling of claim 33 wherein each of the follower flanges further includes a guide ring extending generally perpendicularly from the skirt and adapted in use to overlie the respective annular gasket.

35. The gasket of claim 31 wherein the inclined gasket back wall is disposed at an angle of at least 5° relative to a line perpendicular to an axis of the gasket.

36. The gasket of claim 35 wherein the angle is about 20°.

37. The gasket of claim 31 further including a generally flat wall formed proximate to the heel portion and extending from the inclined back wall.

38. The gasket of claim 31 further including at least one annular bead formed on the inclined front wall of the gasket.

39. A follower flange for a pipe coupling adapted to join adjacent ends of a pair of pipe sections, the pipe coupling including a sleeve member adapted in use to receive and overlie the adjacent ends of the pipe sections, and a pair of annular gaskets adapted in use to be positioned about the adjacent ends of the pipe sections, the annular gaskets each including (i) a front wall confronting and at least partially underlying outer ends of the sleeve and (ii) a back wall, the follower flange comprising:
- an annular skirt having a bottom wall adapted in use to be positioned about an end of a pipe section at one end of said sleeve, and a generally flat inclined skirt wall in axial cross-section extending axially and radially outwardly from the bottom wall in a direction away from the sleeve and adapted in use to cooperate with said back wall of said gasket, the inclined skirt wall being disposed at an angle of a least about 2 ½° relative to a line perpendicular to an axis of the follower flange; and
- a guide ring extending from said skirt and adapted in use to overlie said annular gasket.

40. The follower flange of claim 39 wherein the inclined skirt wall is disposed at an angle of about 10° relative to the perpendicular line.

41. The follower flange of claim 39 further including a corner wall extending between the guide ring and the skirt.

42. The follower flange of claim 39 wherein the corner wall is disposed at an angle of about 45° relative to the axis of the follower flange.

43. The follower flange of claim 39 wherein the guide ring extends generally perpendicularly to the skirt.

44. A pipe coupling for coupling adjacent ends of a pair of pipe sections, comprising:
- a sleeve having a generally cylindrical body portion adapted in use to receive and overlie the adjacent ends of said pipe sections;
- a pair of annular gaskets adapted in use to be positioned about the adjacent ends of said pipe sections, the annular gaskets each including a bottom wall adapted to be disposed about an outer wall of a respective said pipe section, a front wall adapted to engage and at least partially underlie the sleeve, and an inclined back wall extending directly axially and radially outwardly from said bottom wall in a direction away from the sleeve;
- a pair of follower flanges adapted in use to be positioned about the adjacent ends of said pipe sections at opposite ends of the sleeve, each of the follower flanges including a skirt having a bottom wall adapted to be disposed about the outer wall of a respective said pipe section and an inclined skirt wall extending axially and radially outwardly from the skirt bottom wall in a direction away from the sleeve and adapted to confront the back wall of a respective one of the gaskets; and
- a plurality of compression members operatively connecting the pair of follower flanges for urging the follower flanges together whereby to compress the gaskets into sealing engagement between the sleeve, the follower flanges and the outer walls of said pipe sections to provide a fluid tight seal therebetween.

45. The pipe coupling of claim 44 wherein each of the inclined gasket back walls is disposed at an angle of at least about 5° relative to a line perpendicular to an axis of the gasket.

46. The pipe coupling of claim 45 wherein the angle is about 20°.

47. The pipe coupling of claim 44 wherein each of the inclined skirt walls is disposed at an angle of about 10° relative to a line perpendicular to an axis of the follower flange.

48. The pipe coupling of claim 44 wherein the inclined gasket back walls are disposed at a first angle relative to a line perpendicular to an axis and the inclined skirt walls are disposed at a second angle relative to the perpendicular line, the first angle being about twice the second angle.

49. The pipe coupling of claim 44 further including at least one annular bead formed on the front walls of the gaskets.

50. The pipe coupling of claim 44 wherein each of the follower flanges includes a corner wall at the top of the skirt.

51. The pipe coupling of claim 44 wherein each of the gaskets includes a top wall spaced radially outwardly from the bottom wall.

52. The pipe coupling of claim 44 wherein the gasket back wall is generally flat in axial cross-section.

53. The pipe coupling of claim 44 wherein the skirt walls are generally flat in axial cross-section.

54. A pipe coupling for coupling adjacent ends of a pair of pipe sections, comprising:

a sleeve having a generally cylindrical body portion adapted in use to receive and overlie the adjacent ends of said pipe sections;

a pair of annular gaskets adapted in use to be positioned about the adjacent ends of said pipe sections, the annular gaskets each including a bottom wall adapted to be disposed about an outer wall of a respective said pipe section, a front wall adapted to engage and at least partially underlie the sleeve, and a back wall extending radially outwardly from the bottom wall and uninterrupted in annular extent;

a pair of follower flanges adapted in use to be positioned about the adjacent ends of said pipe sections at opposite ends of the sleeve, each of the follower flanges including a skirt having a bottom wall adapted to be disposed about the outer wall of a respective said pipe section and a generally flat, inclined skirt wall in axial cross-section extending axially and radially outwardly from the skirt bottom wall in a direction away from the sleeve and adapted to confront the back wall of a respective one of the gaskets, the inclined skirt wall being disposed at an angle of at least 2 ½° relative to a line perpendicular to an axis of the follower flange; and a plurality of compression members operatively connecting the pair of follower flanges for urging the follower flanges together whereby to compress the gaskets into sealing engagement between the sleeve, the follower flanges and the outer walls of said pipe sections to provide a fluid tight seal therebetween.

* * * * *

UNITED STATES PATENT AND TRADEMARK OFFICE
CERTIFICATE OF CORRECTION

PATENT NO. : 6,168,210 B1
DATED : January 2, 2001
INVENTOR(S) : Edwin A. Bird

It is certified that error appears in the above-identified patent and that said Letters Patent is hereby corrected as shown below:

<u>Column 7, claim 8,</u>
Line 66, change "including a least one" to -- including at least one --.

<u>Column 10, claim 39,</u>
Line 28, change "of a least" to -- of at least --.

Signed and Sealed this

Twelfth Day of February, 2002

Attest:

Attesting Officer

JAMES E. ROGAN
*Director of the United States Patent and Trademark Office*